(12) United States Patent
Hoeft et al.

(10) Patent No.: US 11,269,620 B1
(45) Date of Patent: Mar. 8, 2022

(54) ZERO DOWNTIME UPGRADE THROUGH DELTA DEPLOYMENT PROCEDURE USING TARGET SOFTWARE STACK

(71) Applicant: SAP SE, Walldorf (DE)

(72) Inventors: Kerstin Hoeft, Wiesloch (DE); Steffen Meissner, Heidelberg (DE); Martin Mayer, Heidelberg (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/952,301

(22) Filed: Nov. 19, 2020

(51) Int. Cl.
  *G06F 8/656* (2018.01)
  *G06F 16/22* (2019.01)
  *G06F 8/71* (2018.01)

(52) U.S. Cl.
  CPC .............. *G06F 8/656* (2018.02); *G06F 8/71* (2013.01); *G06F 16/2282* (2019.01)

(58) Field of Classification Search
  USPC ........................................................ 717/170
  See application file for complete search history.

(56) References Cited

U.S. PATENT DOCUMENTS

| | | | |
|---|---|---|---|
| 8,521,706 B2 | 8/2013 | Alpern et al. | |
| 9,244,914 B2 | 1/2016 | Trumbull et al. | |
| 9,436,724 B2 | 9/2016 | Driesen et al. | |
| 9,519,675 B2 | 12/2016 | Specht et al. | |
| 9,767,424 B2 | 9/2017 | Biewald et al. | |
| 9,910,665 B2 | 3/2018 | Haferkorn et al. | |
| 10,303,665 B2 | 5/2019 | Engelko et al. | |
| 10,356,214 B2 | 7/2019 | Joshi et al. | |
| 10,871,962 B2 | 12/2020 | Burkhardt | |
| 2010/0088281 A1 | 4/2010 | Driesen et al. | |
| 2010/0138821 A1 | 6/2010 | Driesen et al. | |
| 2014/0101646 A1 | 4/2014 | Buzaski et al. | |
| 2016/0246833 A1 | 8/2016 | Eberlein et al. | |
| 2017/0123787 A1* | 5/2017 | Burkhardt | G06F 8/656 |
| 2017/0344362 A1* | 11/2017 | Burkhardt | H04L 67/34 |
| 2019/0278862 A1* | 9/2019 | Kapoor | G06F 16/258 |
| 2019/0370405 A1* | 12/2019 | Hoprich | G06F 16/907 |
| 2020/0159852 A1 | 5/2020 | Meissner et al. | |
| 2021/0165694 A1 | 6/2021 | Nabi et al. | |

OTHER PUBLICATIONS

U.S. Appl. No. 16/952,191 filed Nov. 19, 2020, Hoeft et al.

* cited by examiner

*Primary Examiner* — John Q Chavis
(74) *Attorney, Agent, or Firm* — Fish & Richardson P.C.

(57) ABSTRACT

Implementations include a first application server interacting with a first infrastructure table of a first version through a first access schema, providing, during an upgrade, a second application server to execute a portion of the upgrade by interacting with data schema through the first access schema, adjusting a structure of a second infrastructure table to provide an adjusted structure, the structure of the first version and the adjusted structure of the second version, the second infrastructure table including a copy of the first infrastructure table, providing a second access schema of the second version, providing a third application server configured to interact with data schema through the second access schema, and activating, by the third application server using an activator of the second version, objects of the second version, the activator including features that are different than an activator of the first version.

20 Claims, 14 Drawing Sheets

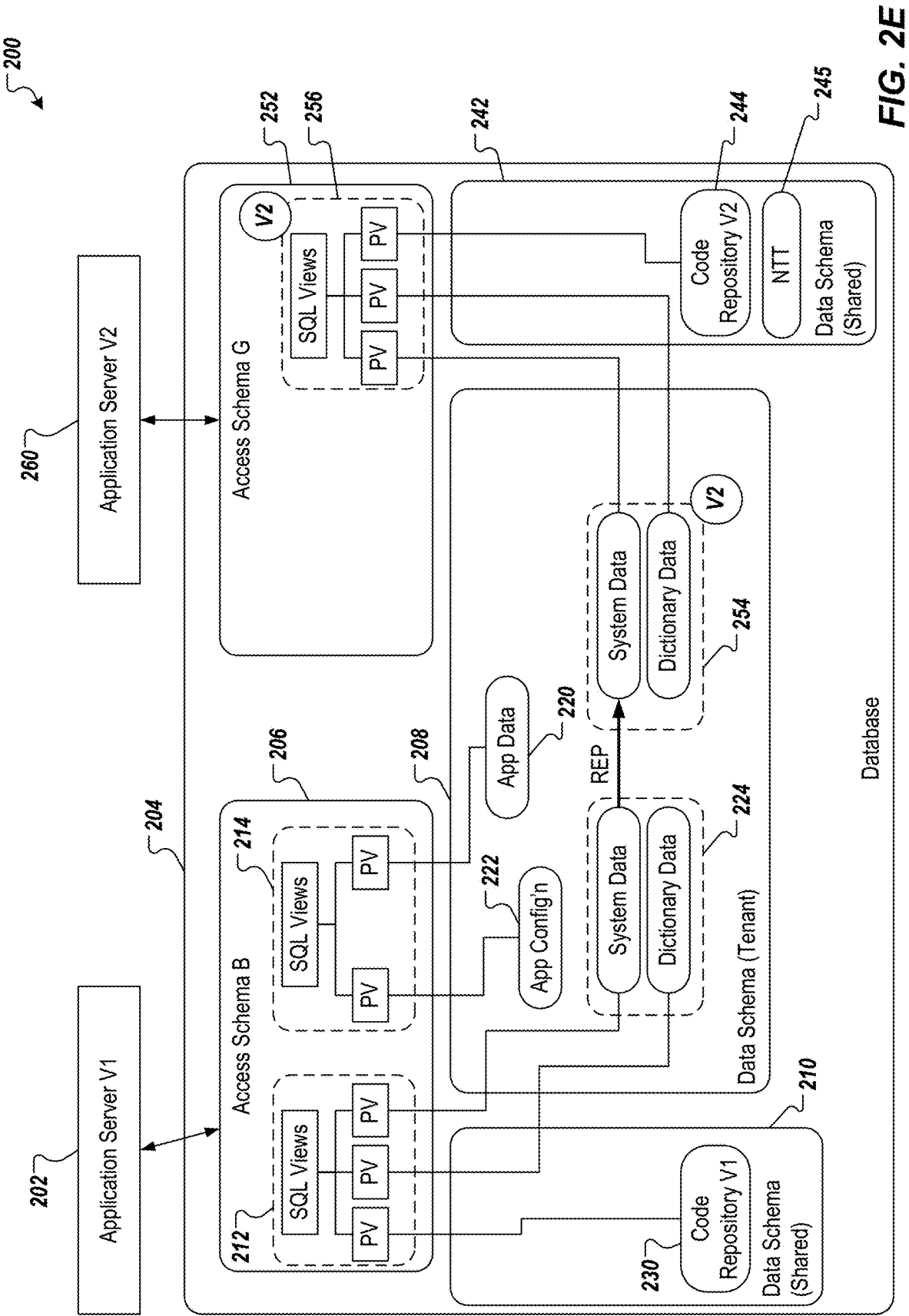

ZERO DOWNTIME UPGRADE THROUGH DELTA DEPLOYMENT PROCEDURE USING TARGET SOFTWARE STACK

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases provided in one or more database systems.

During a lifecycle of the application and/or database, one or more maintenance operations may be required. Example maintenance operations include upgrading, updating (e.g., patching), and testing. In order to perform such maintenance procedures, the application, and/or database may be taken offline, such that users are unable to interact with the application and/or database. This is referred to as downtime. Although software providers have strived minimize downtime, achieving zero-downtime during such maintenance procedures has been elusive. An example goal for zero-downtime includes deploying an upgrade with a maximum read-only usage phase (e.g., maximum of 5 minutes).

In some systems, an upgrade tool is used to perform an upgrade from a first version (V1) to a second version (V2). The upgrade tool can use the system that it upgrades for certain actions. This is done to re-use functionality within the system, which is hard to replicate or cannot be replicated in the upgrade tool. For example, the upgrade tool can use functionality provided by a data dictionary provided in a database system. In some instances, however, an upgrade can include changes that cannot be handled by the functionality of the system that the upgrade tool re-uses. For example, if a bundle of changes contains new functionality in the data dictionary (e.g., a new field type) and data dictionary content, such as objects using the new functionality (e.g., a table definition with the new field type), the data dictionary of the second version needs to be called during the upgrade. This is because only the second version can handle the delivered content. In short, a traditional upgrade procedure cannot deploy transports delivering new features of the data dictionary activator together with data dictionary objects (e.g., table definitions, view definitions etc.) that use the new features.

In some traditional approaches, to handle this, several smaller deltas are deployed to avoid a need to use the second version for the upgrade. However, deployment of numerous deltas overly constrains the system. For example, some approaches, such as continuous integration, continuous deployment (CICD) and deploy often, break the deployment into a set of smaller deployments and deploy the new functionality one deployment before deploying the new content. This has disadvantages. For example, the deployment procedure adds constraints to the system (e.g., disabling user extensibility during the deployment runtime) and requires additional resources (e.g., requiring more hardware due to table cloning). For frequent deployments the constraints are applied too frequently and inefficiencies multiply. As another example, constraints are put on the development process for new features, and, in particular, the ability to improve features after first adoption by application developers and only expose the improved version to customers.

SUMMARY

Implementations of the present disclosure are directed to upgrade procedure that supports zero-downtime during upgrade of an application. More particularly, implementations of the present disclosure are directed to an infrastructure and upgrade procedure, which enable changes to be deployed during an upgrade of an application from a first version to a second version, where the first version and the second version are each used to run respective portions of the upgrade.

In some implementations, actions include providing a first application server corresponding to the first version, the first application server enabling production use of the database system during an upgrade procedure, the first application server interacting with at least a first set of infrastructure tables of the first version within the database system through a first access schema, providing, by an upgrade tool and during the upgrade procedure, a second application server corresponding to the first version, the second application configured to execute at least a portion of the upgrade procedure by interacting with data schema of the database system through the first access schema, adjusting a structure of at least one infrastructure table in a second set of infrastructure tables to provide an adjusted structure, the structure corresponding to the first version and the adjusted structure corresponding to the second version, the second set of infrastructure tables including a copy of the first set of infrastructure tables, providing, in the database system, a second access schema including system views corresponding to the second version, providing, by the upgrade tool, a third application server corresponding to the second version and being configured to interact with data schema of the database system through the second access schema, and activating, by the third application server using a data dictionary activator corresponding to the second version, data dictionary objects of the second version, the data dictionary activator comprising one or more features that are different than a data dictionary activator of the first version. Other implementations of this aspect include corresponding systems, apparatus, and computer programs, configured to perform the actions of the methods, encoded on computer storage devices.

These and other implementations can each optionally include one or more of the following features: the data dictionary objects of the second version are different than data dictionary objects of the first version; adjusting a structure of at least one infrastructure table in the second set of infrastructure tables includes: determining a difference between first table information corresponding to the first set of infrastructure tables and second table information corresponding to the second set of infrastructure tables for the second version, and executing one or more data definition language (DDL) statements provided based on the difference to adjust the structure to provide the adjusted structure; determining a difference between first table information corresponding to the first set of infrastructure tables and second table information corresponding to the second set of infrastructure tables for the second version includes executing, by the second application server, reading table definitions of the second version from the second data schema, comparing the structure of tables in the second set of infrastructure tables with the table definitions, and computing the one or more DDL statements; actions further include copying, using data definition language (DDL) statements provided by the second application server, the first set of infrastructure tables to provide the second set of infrastructure tables; adjusting is executed using data corresponding to the second version stored in a shared container deployed to the database system; and actions further include switching production use from the first application server to the third application server.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 2A-2K depicts an example zero-downtime upgrade procedure in accordance with implementations of the present disclosure.

Like reference symbols in the various drawings indicate like elements.

DETAILED DESCRIPTION

Implementations of the present disclosure are directed to upgrade procedure that supports zero-downtime during upgrade of an application. More particularly, implementations of the present disclosure are directed to an infrastructure and upgrade procedure, which enable changes to be deployed during an upgrade of an application from a first version (V1), also referred to herein as a start release, to a second version (V2), also referred to herein as a target release, without downtime for continued production use of the application. In some implementations, as described in further detail herein, the source release and the target release are each used to run respective portions of the upgrade. In this manner, limitations of procedures that at least partially use the start release are avoided. As described in further detail herein, zero-downtime upgrade procedure of the present disclosure enables deployment of transports delivering new features of the data dictionary activator together with data dictionary objects (e.g., table definitions, view definitions etc.) that use the new features.

Implementations can include actions of providing a first application server corresponding to the first version, the first application server enabling production use of the database system during an upgrade procedure, the first application server interacting with at least a first set of infrastructure tables of the first version within the database system through a first access schema, providing, by an upgrade tool and during the upgrade procedure, a second application server corresponding to the first version, the second application configured to execute at least a portion of the upgrade procedure by interacting with data schema of the database system through the first access schema, adjusting a structure of at least one infrastructure table in a second set of infrastructure tables to provide an adjusted structure, the structure corresponding to the first version and the adjusted structure corresponding to the second version, the second set of infrastructure tables including a copy of the first set of infrastructure tables, providing, in the database system, a second access schema including system views corresponding to the second version, providing, by the upgrade tool, a third application server corresponding to the second version and being configured to interact with data schema of the database system through the second access schema, and activating, by the third application server using a data dictionary activator corresponding to the second version, data dictionary objects of the second version, the data dictionary activator comprising one or more features that are different than a data dictionary activator of the first version.

Figure 1:
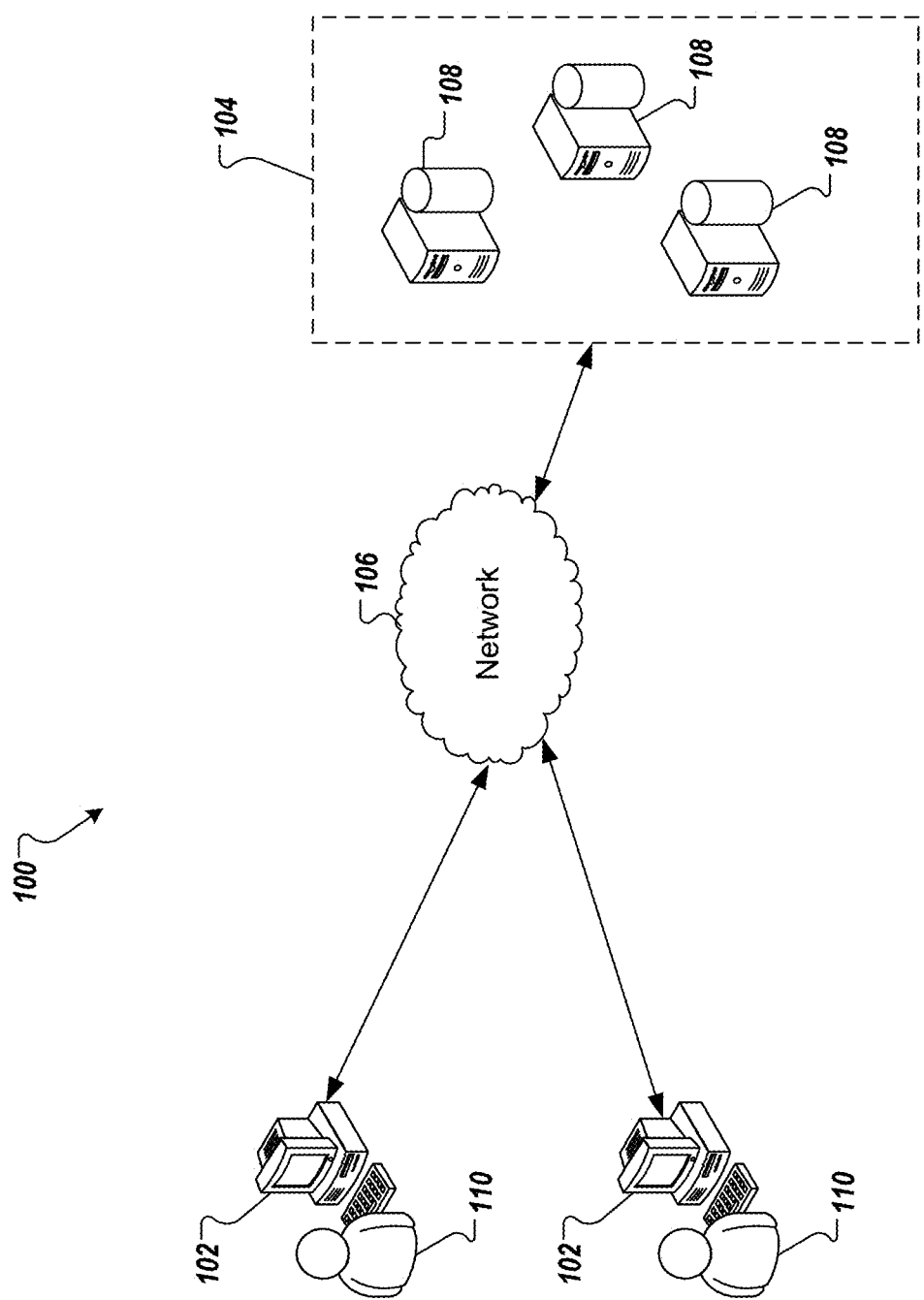
FIG. 1 depicts an example architecture that can be used to execute implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 110 can include a user, who interacts with an application that is hosted by the server system 104. In another example context, a user 110 can include a user, who interacts with the server system 104, as described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices, e.g., the client devices 102, over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes business applications that are executed in a client-server architecture, such as the example architecture 100 of FIG. 1. In some examples, business applications can be provided in a business suite that includes two or more business applications. Example business applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations, applications and/or databases undergo lifecycle management. In some examples, lifecycle management can include executing an upgrade procedure. An example upgrade procedure can include upgrading software. For example, an upgrade from a first version (e.g., V1) to a second version (e.g., V2). An example upgrade can include changes to a data schema of the database. In some examples, a data schema (also referred to as database schema) is a data structure that defines how data is to be stored in the database. In some examples, the database schema can be defined in a formal language that is supported by a database management system (DBMS), and can include a set of formulas (also referred to as constraints) imposed on the database. In general, a data schema can be described as a catalog that specifies all database objects that can be stored in the database. In some examples, different data schemas (e.g., V1 versus V2), can have different objects with the same object name, but different structures.

As introduced above, execution of maintenance procedures, such as an upgrade) can result in downtime (e.g., unavailability) of an application and/or database. Further, for applications, downtime windows for maintenance are a factor to user experience that hinders use of applications. For example, a vendor of an application can develop an upgrade to the application, which is in production use by customers. In some instances, it is difficult to set a time for the downtime windows to eliminate the impact on customers. For example, customers may access the application from different time zones. To alleviate this, the concept of zero-downtime maintenance is introduced to provide continuous (or approximately continuous) availability of an application during maintenance procedures and eliminate negative effects of user experience due to the downtime windows.

In some systems, an upgrade tool is used to perform an upgrade from a first version (V1) to a second version (V2). The upgrade tool can use the system that it upgrades for certain actions. This is done to re-use functionality within the system, which is hard to replicate or cannot be replicated in the upgrade tool. For example, the upgrade tool can use functionality provided by a data dictionary provided in a database system. In some instances, however, an upgrade can include changes that cannot be handled by the functionality of the system that the upgrade tool re-uses. For example, if a bundle of changes contains new functionality in the data dictionary (e.g., a new field type, such as "geospatial") and data dictionary content, such as objects using the new functionality (e.g., a table definition with the new field of type "geospatial"), the data dictionary of the second version needs to be called during the upgrade. This is because only the second version can handle the delivered content (e.g., computing an alter statement or a create statement for tables with a field of type "geospatial"). In short, a traditional upgrade procedure cannot deploy transports delivering new features of the data dictionary activator together with data dictionary objects (e.g., table definitions, view definitions etc.) that use the new features.

In some traditional approaches, several smaller deltas are deployed to avoid a need to use the second version for the upgrade. However, deployment of numerous deltas overly constrains the system. For example, some approaches, such as continuous integration, continuous deployment (CICD) and deploy often, break the deployment into a set of smaller deployments and deploy the new functionality one deployment before deploying the new content. This has disadvantages. For example, the deployment procedure adds constraints to the system (e.g., disabling user extensibility during the deployment runtime) and requires additional resources (e.g., requiring more hardware due to table cloning). For frequent deployments the constraints are applied too frequently and inefficiencies multiply. As another example, constraints are put on the development process for new features, and, in particular, the ability to improve features after first adoption by application developers and only expose the improved version to customers.

In view of the foregoing, and as introduced above, implementations of the present disclosure are directed to an upgrade procedure that supports zero-downtime during upgrade of an application. More particularly, implementations of the present disclosure are directed to an infrastructure and upgrade procedure, which enable changes to be deployed during an upgrade of an application from a first version (V1), also referred to herein as a start release, to a second version (V2), also referred to herein as a target release, without downtime for continued production use of the application. In some implementations, as described in further detail herein, the source release and the target release are each used to run respective portions of the upgrade. In this manner, limitations of procedures that at least partially use the start release are avoided. As described in further detail herein, zero-downtime upgrade procedure of the present disclosure enables deployment of transports delivering new features of the data dictionary activator together with data dictionary objects (e.g., table definitions, view definitions etc.) that use the new features.

In further detail, the upgrade procedure of the present disclosure uses a modified setup in the database, in which database objects are deployed to different schemas. For example, database object holding persistency are deployed to a data schema, and the database objects in the data schema are exposed to an access schema using projection views (PVs). Further, database objects that do not hold persistency are deployed to an access schema. The projection views enable modification of the persistency without impacting the running system and, thus, deploying the second version in parallel to production use of the first version. Once the target release (second version) is deployed and the persistency is adjusted, users are switched from the first version to the second version.

To provide further context for implementations of the present disclosure, a so-called blue-green deployment for an upgrade is described. In some examples, the blue-green deployment can provide zero-downtime deployments of new software versions. The name blue-green deployment is derived from analogy to mechanisms used for runtime blue-green deployments. In runtime blue-green deployments, a new (green) runtime is deployed in parallel to a current (blue) runtime. After deployment, users are re-directed to the green runtime, and the blue runtime is stopped.

The blue-green deployment can be used for scenarios including so-called code push down, in which database objects, such as views, table functions, and procedures, are pushed to the database. In some examples, a separate database schema is used as the runtime environment for the code in the database. This schema is referred to as an access schema and includes the code objects. A separate, so-called data schema holds the persistency. The application only has access to the access schema, and objects in the data schema are exposed as views to the access schema. During the blue-green deployment, a new access schema (green) is provided for the target version (e.g., V2) in parallel with the current access schema (blue) used by the source version (e.g., V1, also referred to as source, and/or production). Accordingly, during the deployment (upgrade), there are multiple access schemas existing at the same time (e.g., blue, and green).

The blue-green deployment enables structure, and name abstraction. For example, a view layer hides structure changes, and content changes in the data schema during the deployment. In some examples, new columns can be added during the deployment. The new columns are not selected by the view in the blue access schema. A table column can have a different name than specified (e.g., in a data dictionary (DDIC)). In this manner, complex type changes can be performed without affecting availability of the table data. For example, a new column can be added with the target type and populated with data. In the green access schema, the target column is exposed instead of the previous column.

As another example, a table can have a different name than specified (e.g., in the DDIC). This enables a shadow table to be created and populated for a production-use table. In the green access schema, the new table is then exposed instead of the old table. In some examples, obsolete columns, and tables are deleted from the persistency after the deployment is complete. As another example, a rename column, and a rename table traditionally require an exclusive database lock, which would result in downtime. To avoid this, the names of the tables in the data schema are not adjusted to the DDIC names after the deployment, and remain to be used during the release. The name differences are shielded from the application by the view layer in the access schema.

Implementations of the present disclosure include a deploy tool (e.g., a zero-downtime maintenance (ZDM) deploy tool) also referred to herein as an upgrade tool. An example ZDM procedure, and respective deploy tool (referred to as an upgrade tool) are described in further detail in commonly assigned, U.S. Pat. No. 10,303,665, filed on Sep. 24, 2014, the disclosure of which is expressly incorporated herein by reference in its entirety for all purposes.

In some implementations, an upgrade can include a new (V2, or target release) data dictionary activator, which can be described as a program that computes the referential integrity of data definitions within a database system. In some implementations, the upgrade procedure of the present disclosure uses the data dictionary activator (V2) to activate the data dictionary objects that are changed with the upgrade. Because this version (V2) of the data dictionary activator contains all of the new features provided through the upgrade, the upgrade procedure of the present disclosure resolves the problem of traditional approaches that data dictionary objects using new data dictionary features cannot be activated with the source release (V1) of the data dictionary activator.

In some implementations, for starting the target system (V2) and executing the data dictionary activator, the upgrade procedure of the present disclosure provides additional database tables and views for access by the application server (e.g. the tables holding the data dictionary content). In some examples, the set of tables is denoted as $T_{Act}$ and the set of views is denoted as $V_{Act}$. In order to establish a preliminary system for executing the data dictionary activator (V2), tables in the set $T_{Act}$ are copied from the source system (V1). In some examples, sets of tables that are not included in $T_{Act}$ are denoted as a set $T/T_{Act}$.

In the target release (V2), the structure of the tables of the set $T_{Act}$ can be different from that in the source release (V1). In view of this, the upgrade procedure of the present disclosure, adjusts the structure of these tables to the target release (V2) before starting the preliminary system and running the data dictionary activator (V2). Because the tables in the set $T_{Act}$ are not subject to customer extensibility (i.e., customers cannot change the structure of these tables), the data dictionary activator is not needed to adjust the structure of these tables to the new release. Instead, the runtime description of the tables (nametab) can be used to compute the difference between the versions (V2 versus V1) of the tables. In some examples, the difference can be computed using a table delta calculator (e.g., provided as part of a software-online-import (SOI) tool). In some examples, after the set $T_{Act}$ is prepared, a data dictionary import is executed, and a second system (green system) is provided to access the set $T_{Act}$ and run the data dictionary activation and distribution (e.g., computing the dynamic data library (DDL) statements executed to adjust the table structure to the target version (V2)).

FIGS. 2A-2K depicts an example zero-downtime upgrade procedure in accordance with implementations of the present disclosure.

Figure 2A:
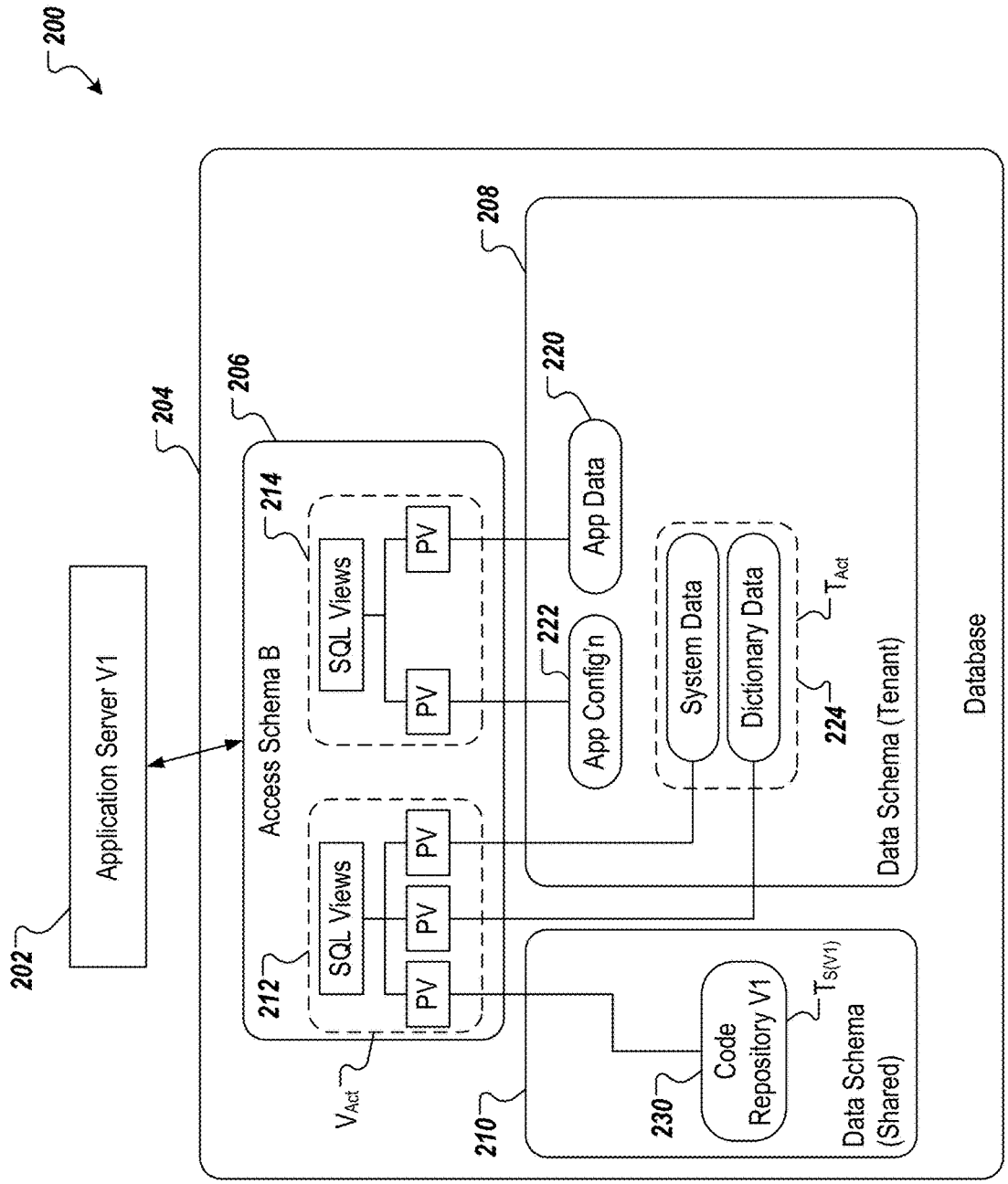

With particular reference to FIG. 2A, a system 200 includes an application server 202 and a database system 204. The application server 202 hosts one or more applications, which corresponds to a first version (V1, source release). In some examples, the example of FIG. 2A represents production runtime (e.g., blue runtime) before execution of the upgrade procedure of the present disclosure. In the context of the present disclosure, an upgrade is to be performed to move from V1 to a second version (V2, target release). For example, an application (e.g., executed in an application server) and database system (e.g., access schema(s), database schema(s)) can be upgraded from V1 to V2.

In the example of FIG. 2A, the database system 204 includes an access schema 206, a first data schema 208, and a second data schema 210. The example of FIG. 2A depicts a multi-tenancy scenario, in which distinct entities (customers) each have their own, customer-specific data, and all tenants share shared data. Accordingly, the first data schema 208 is a tenant data schema for data that is specific to a particular tenant (i.e., a particular customer), and the second data schema 210 is a shared data schema for data that is shared by all tenants. In a multi-tenancy scenario, the second data schema 210 can be described as a shared container (e.g., persistency holding code (software) shared between tenants). As described in further detail herein, the upgrade procedure of the present disclosure stores the data dictionary activator of the target release (V2) in the shared container. In some examples, in a non-multi-tenancy (single tenant) scenario, the tables 230 contained in the second data schema 210 can also be contained within the data schema 208.

In the context of blue-green deployment of an upgrade (e.g., a blue runtime for production use of V1, a green runtime for deployment of V2, and subsequent production switch from blue to green), introduced above, the application server 202, the access schema 206, the first data schema 208, and the second data schema 210 can be collectively considered a blue runtime. In some examples, the access schema 206 enables components executing in the application server 202 to interact with data stored in the database system 204. In the depicted example, the access schema 206 includes system views 212 and application views 214. In some examples, the system views 212 enable access to data in the first data schema 208 and the second data schema 208. In some examples, access to data in the first data schema 208 is read and write (rw) access. In some examples, access to data in the second data schema 210 is read-only (ro) access.

In the example of FIG. 2A, the first data schema 208 includes application data 220, application configuration data 222, and infrastructure data 224 (e.g., system data, data dictionary data). In some examples, the application views 214 enable views into the application data 220 and the application configuration data 222. In some examples, one or more of the system views 212 enable views on the infrastructure data 224. In the context of implementations of the present disclosure, the systems views 212 can be denoted as $V_{Act}$ and include views that are used to start and run the data dictionary activation and conversion, as described in further detail herein. Example infrastructure data includes, without limitation, system data, dictionary data, and a code repository. The infrastructure data 224 corresponds to the source release (V1). In some examples, the infrastructure data 224 represents the set $T_{Act}$, introduced above. In some examples, the application data 220 and the application configuration data 22 collectively represent the set $T/T_{Act}$.

The second data schema 210 includes shared data 230 (e.g., code repository), which corresponds to the source release (V1). In some examples, one or more of the system views enables views into the shared data 230. In some examples, the shared data 230 includes a set of shared tables $T_S$. In some examples, and as described in further detail herein, the set $T_S$ stores computer-executable code (e.g., data dictionary activation of source release (V1)).

In accordance with implementations of the present disclosure, an upgrade from V1 to V2 can be initiated by an upgrade tool using an upgrade package. The upgrade package includes an upgrade configuration that defines, among other information, changes that are to be included as part of V2. Example changes include, without limitation, structural changes and content (e.g., new features of the data dictionary activator together with data dictionary objects, such as table definitions, view definitions, and the like that use the new features).

Figure 2B:
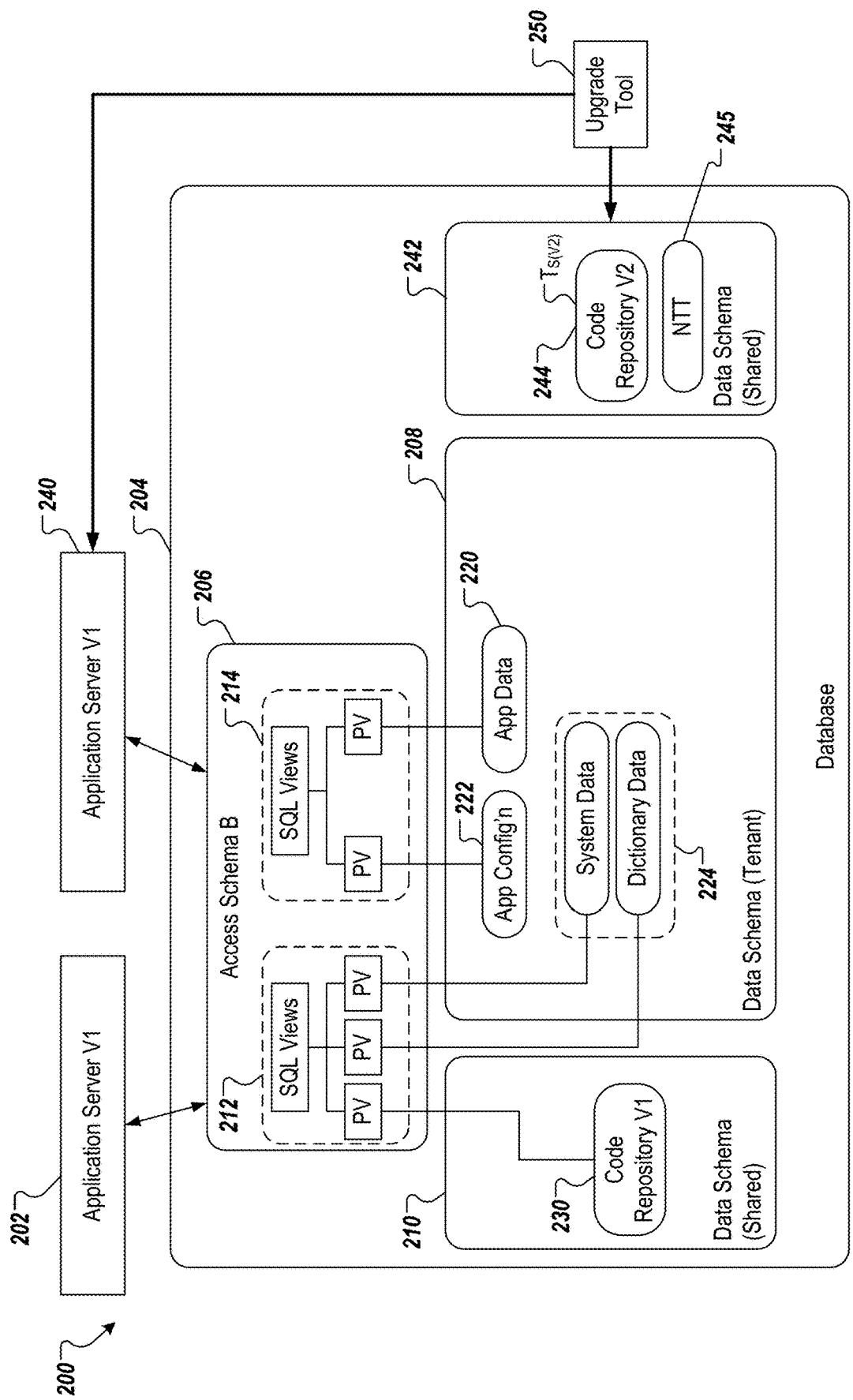

In further detail, an upgrade tool initiates the upgrade from the source release (V1) to the target release (V2). FIG. 2B depicts initial activities executed during the upgrade procedure. In some implementations, an application server 240 (e.g., green) is instantiated by an upgrade tool 250 to execute upgrade activities, as described herein. As depicted in FIG. 2B, the application server 240 is linked to the access schema 206 (blue access schema). More particularly, the upgrade tool 250 deploys a table delta handler to the source release (V1) system (blue system). In some examples, the table delta handler corresponds to the target release (V2). For example, prior to the upgrade procedure, the table delta handler can be provided as an update to the system 200.

As described in further detail herein, the table delta handler is able to handle features of the target release (V2). The upgrade tool 250 configures the application server 240 (with the start release (V1) kernel software) to connect to the access schema 206 and starts the application server 240. Accordingly, the software executed in the application server 240, at this point in the upgrade procedure, is the start release (V1) software. In a multi-tenancy setup, the upgrade tool connects a shared data schema 242 (shared container) to the database system 204. In some examples, in a non-multi-tenancy (single-tenant) setup, the tables 244, 245 contained in the container 242 can be deployed to the schema 208. The shared data schema 242 corresponds to the target release (V2). At this point in the upgrade procedure, the shared data schema 242 is not yet connected to an access schema. The shared data schema 242 further stores nametab tables (NTT) 245 containing runtime structure information for the tables in the set $T_{Act}$. In some examples, the nametab tables can be described as a set of database tables that contain table information (e.g., tables, columns, datatypes) of data dictionary objects to be activated for the target release. In some examples, the shared data schema 242 also stores view definitions for a set of views $V_{Act\ \#1}$ to be created for the target release.

Figure 2C:
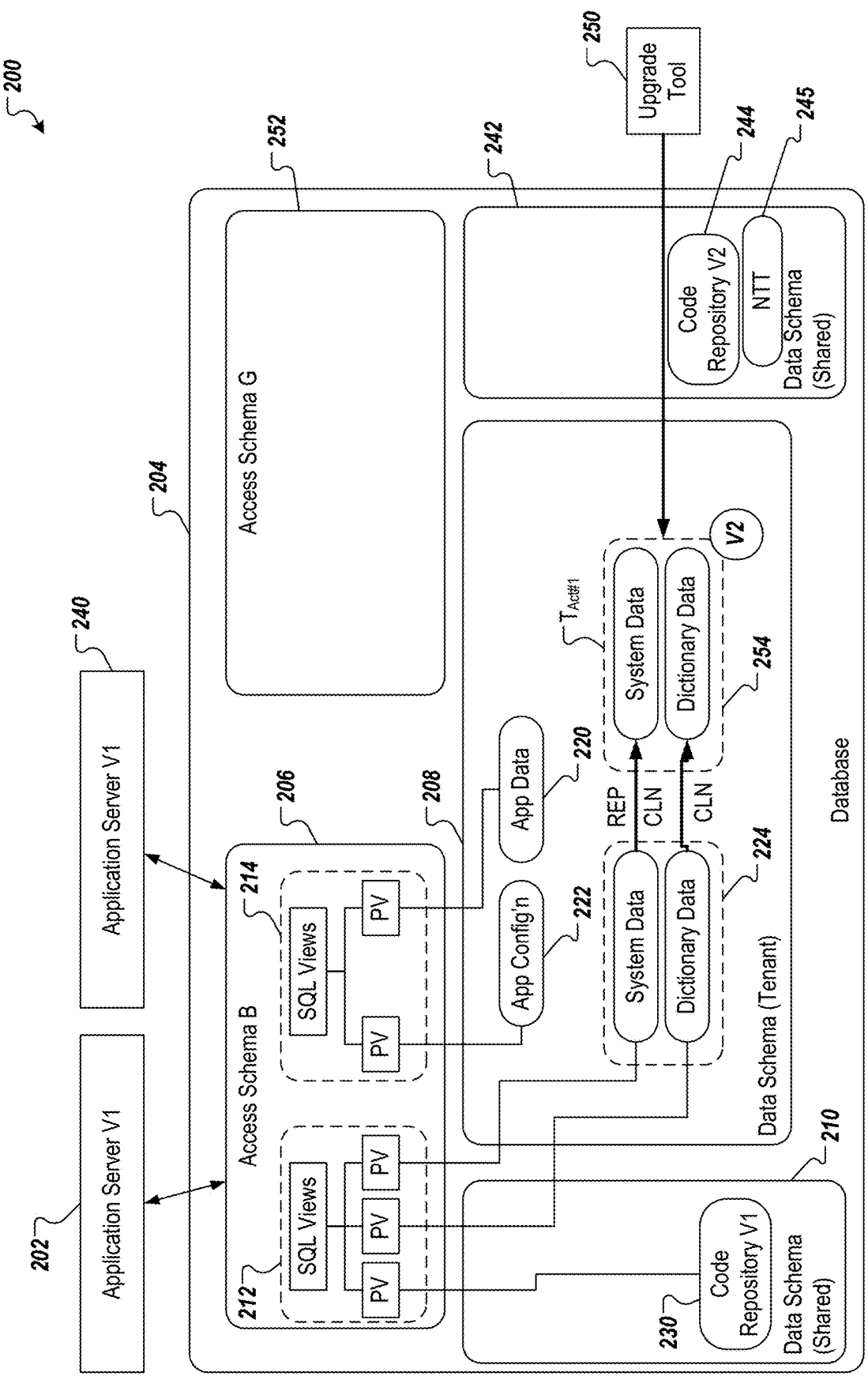

With reference to FIG. 2C, the upgrade tool 250 creates an access schema 252 (green access schema) in the database system 204. The upgrade tool 250 clones (CLN) the set $T_{Act}$, with content, as a set $T_{Act\ \#1}$. For example, the application server 240 generates DDL statements for creating copies of the tables in the set $T_{Act}$, and a DDL executor of the SOI tool executes the DDL statements to provide the set $T_{Act\ \#1}$.

In some examples, the set $T_{Act\ \#1}$ includes activator read-only data, activator read-write data, and active nametab data. In some examples, the activator read-only data includes activator tables that include inactive data dictionary source data and active nametab data of tables in the set $T_{Act}$.

In some examples, the activator read-write data includes active data dictionary source data, inactive nametab data of tables in the set $T/T_{Act}$, a distributor result data. In some examples, the active nametab data includes nametab data of tables in the set $T/T_{Act}$.

In some examples, the application server 240 copies the nametab information 245 for tables in the set $T_{Act}$ from the shared data schema 242 to the data schema 254. Further, the nametab information of the data dictionary objects without database representation (data elements, structures, table types etc.) are copied from the data schema 242 to the active nametab data in the set $T_{Act \#1}$ to have up-to-date type definitions.

In some examples, the table delta handler adjusts the structure of the tables in the set $T_{Act \#1}$ to the target release (V2). For example, the table delta handler reads the target table definitions from the data schema 242, compares the structure of tables in the set $T_{Act \#1}$ with the target definition, computes a statement to be executed to adjust the structure (e.g. "add field," "change field type"), and computes statements to create table structures corresponding to the target release (V2). The upgrade tool 250 executes the statements. In further detail, the application server 240 runs the table delta calculator of SOI to compare the old nametabs of tables in the set $T_{Act}$ with their new nametabs delivered with the data schema 242. The result is a set of DDL statements for altering tables in the set $T_{Act \#1}$ and for creating the projection views and other views in the access schema 252.

In some examples, system data of the set $T_{Act \#1}$ is set for continuous replication (REP) based on changes to system data of the set $T_{Act}$ during production use of the source release system (blue runtime). That is, any changes made to the set $T_{Act}$ are replicated in the set $T_{Act \#1}$.

Figure 2D:
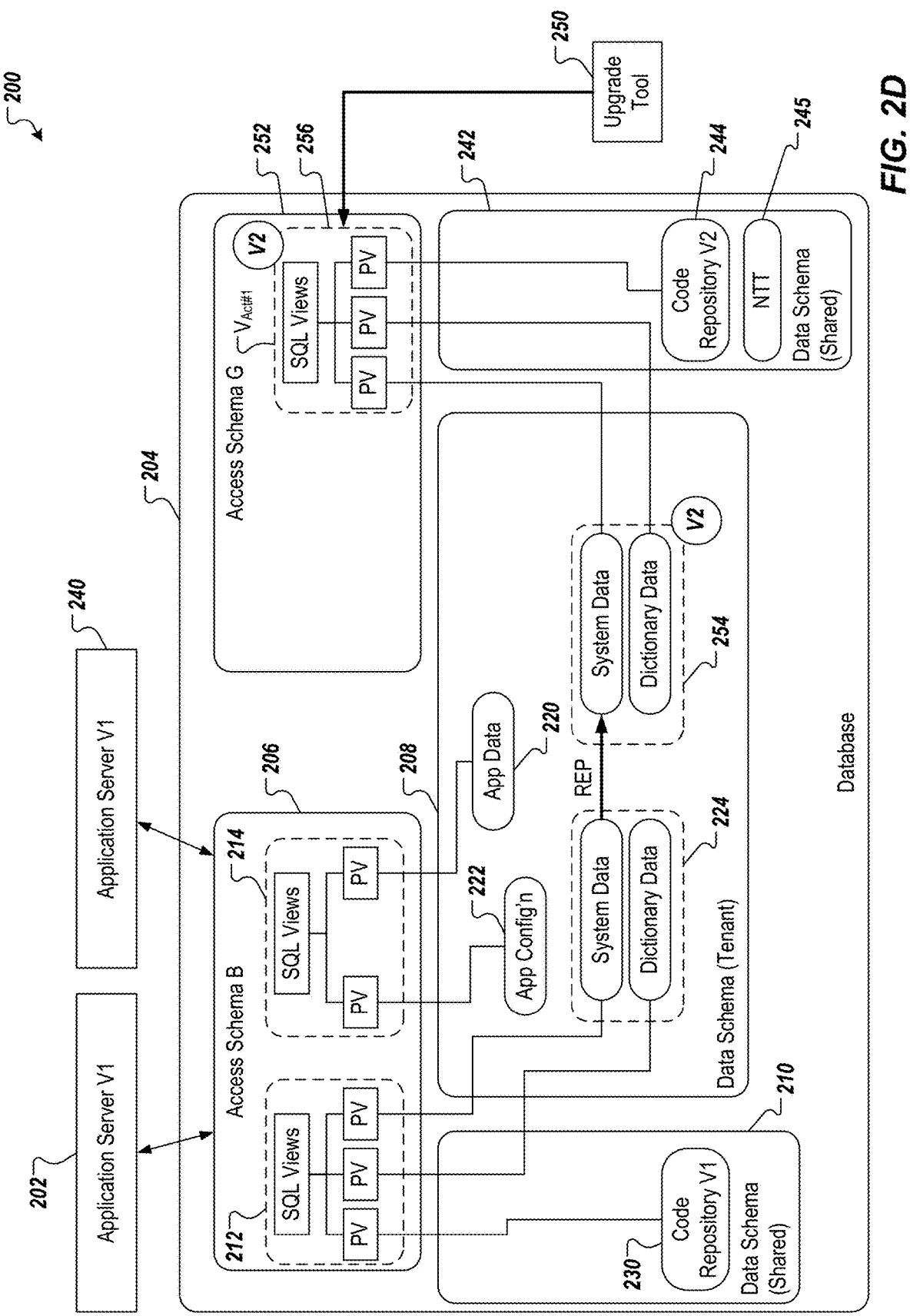

With reference to FIG. 2D, the upgrade tool 250 creates system views 256 (e.g., projection views) for tables in the set $T_{Act \#1}$ in the access schema 252. In some examples, the system views 256 are assigned with the name of a respective table, as defined in the data dictionary. For example, if a table is called DD02L in the data dictionary, the cloned table (in the set $T_{Act \#1}$) is called DD02L #1, and the projection view is called DD02L. In some examples, the system views 256 correspond to the target release structure. After creating the system views 256, the upgrade tool 250 stops the application server 240.

With reference to FIG. 2E, the upgrade tool 250 configures an application server 260 to connect to the access schema 252 and starts the application server 260. The application server 260 executes the target release (V2) kernel software. The upgrade tool 250 adjusts the data content in the set $T_{Act \#1}$ to the target release (V2). In some examples, a slot is provided to run programs to adjust the content in the set $T_{Act \#1}$ to the target release. In some examples, adjusting the content can be done by calling a set of data migration programs, defined by the table owners to migrate data. After this, the tables in the set $T_{Act \#1}$ have the target release structure and migrated content.

At this point in the upgrade process, the green system (also referred to as the green runtime) is considered to be running. This is the first start of the green system, which will subsequently take over production use from the blue system. In some examples, the green system can be used to run update and/or upgrade activities, but only has access to tables in the set $T_{Act}$ and the views $V_{Act}$, which is the set of views needed to start and run the data dictionary activation and conversion.

Figure 2F:
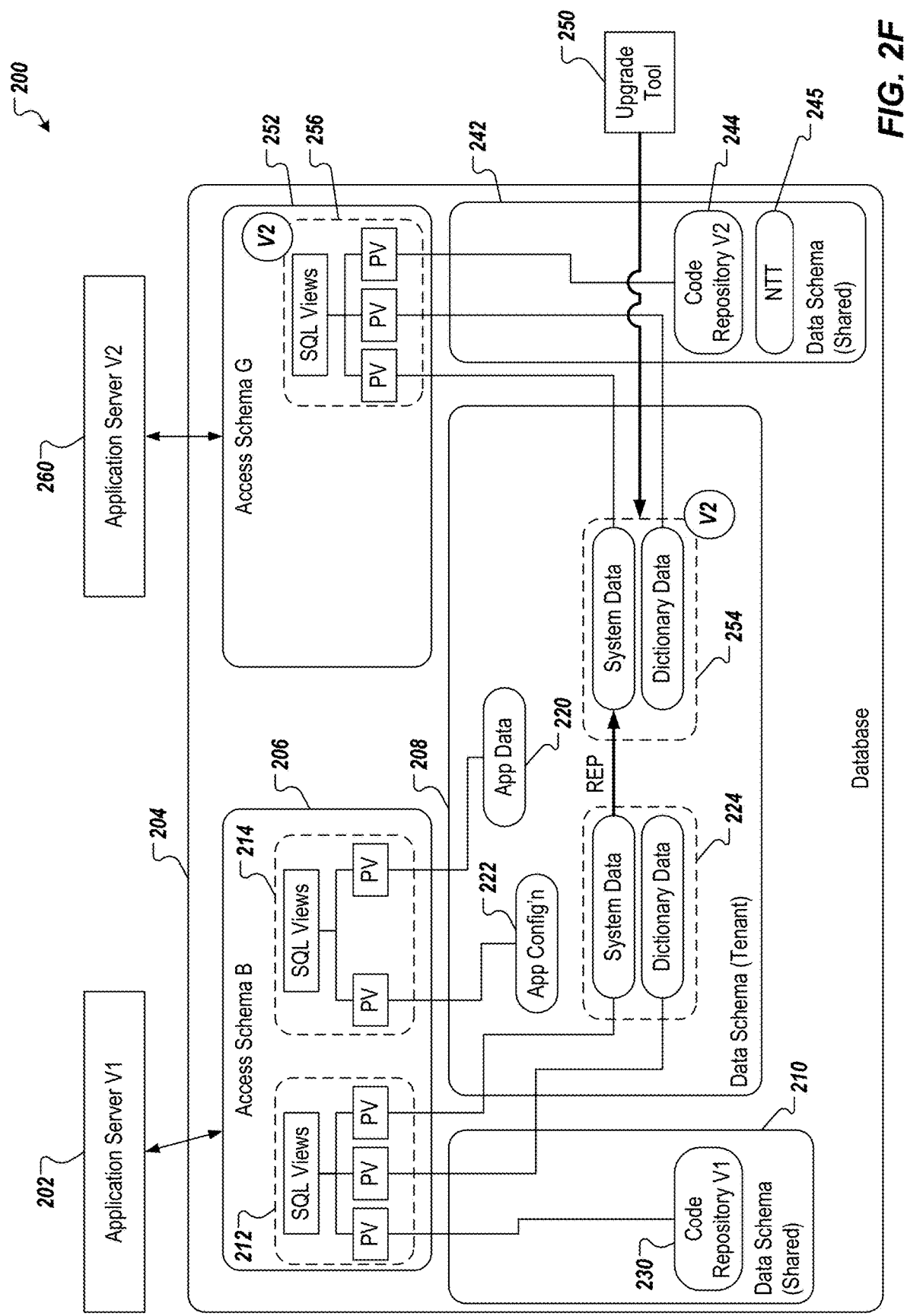

With reference to FIG. 2F, a data deploy tool (e.g., R3trans) deploys the target release table definitions to the set $T_{Act \#1}$. This includes all changed table definitions in the target release for both the set $T_{Act}$ and the set $T\backslash T_{Act}$. In some examples, the data dictionary activator (i.e., data dictionary activator of the target release (V2)) computes the target structure definitions. In some examples, the upgrade tool 250 determines which tables will receive an import of data during the upgrade (e.g., a set of tables written by data import tool denoted as $T_{Import}$) and which tables are written by an application data migration program (e.g., a set of tables denoted as $T_{Mig}$).

In some examples, a data dictionary distribution program executed in the application server 260 computes the DDL statements to adjust tables to the target definition. In some examples, for tables in the set $T_{Import}$ and the set $T_{Mig}$, a statement is computed to create a new table with a new name, $T_{Import \#1}$ and $T_{Mig \#1}$, respectively. Tables with a complex structure change are cloned and the data is adjusted (e.g., a set of tables with a complex structure change, written by the conversion program, and denoted as set $T_{Conv}$). The data dictionary distribution program computes the DDL statements to create the views in the access schema 252 with the target definition. The upgrade tool 250 adjusts the tables in the data schema 208 using the statements computed before.

Figure 2G:
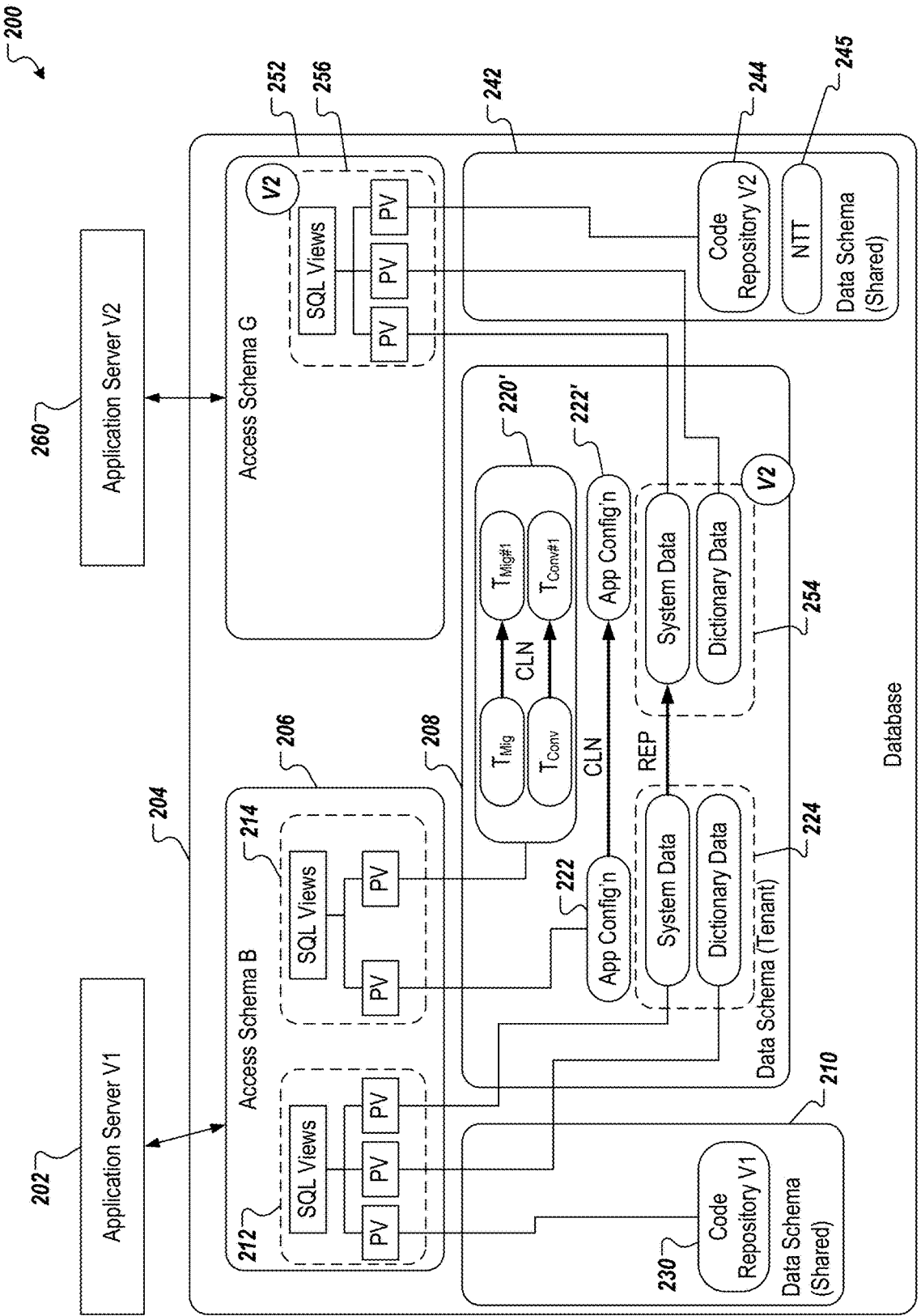

Referring now to FIG. 2G, the upgrade tool 250 clones the tables in the data schema 208 using the statements computed before. In some examples, the application data 220 is cloned to provide application data 220', and the application configuration data 222 is cloned to provide application configuration data 222'. In further detail, the upgrade tool 250 sets tables in $T_{Import}$, $T_{Mig}$, and $T_{Conv}$ in the blue system to read-only, and tables in $T_{Import}$, $T_{Mig}$, and $T_{Conv}$ are cloned to provide $T_{Import \#1}$, $T_{Mig \#1}$, and $T_{Conv \#1}$, respectively, and the structures are adjusted to the target release.

Figure 2H:
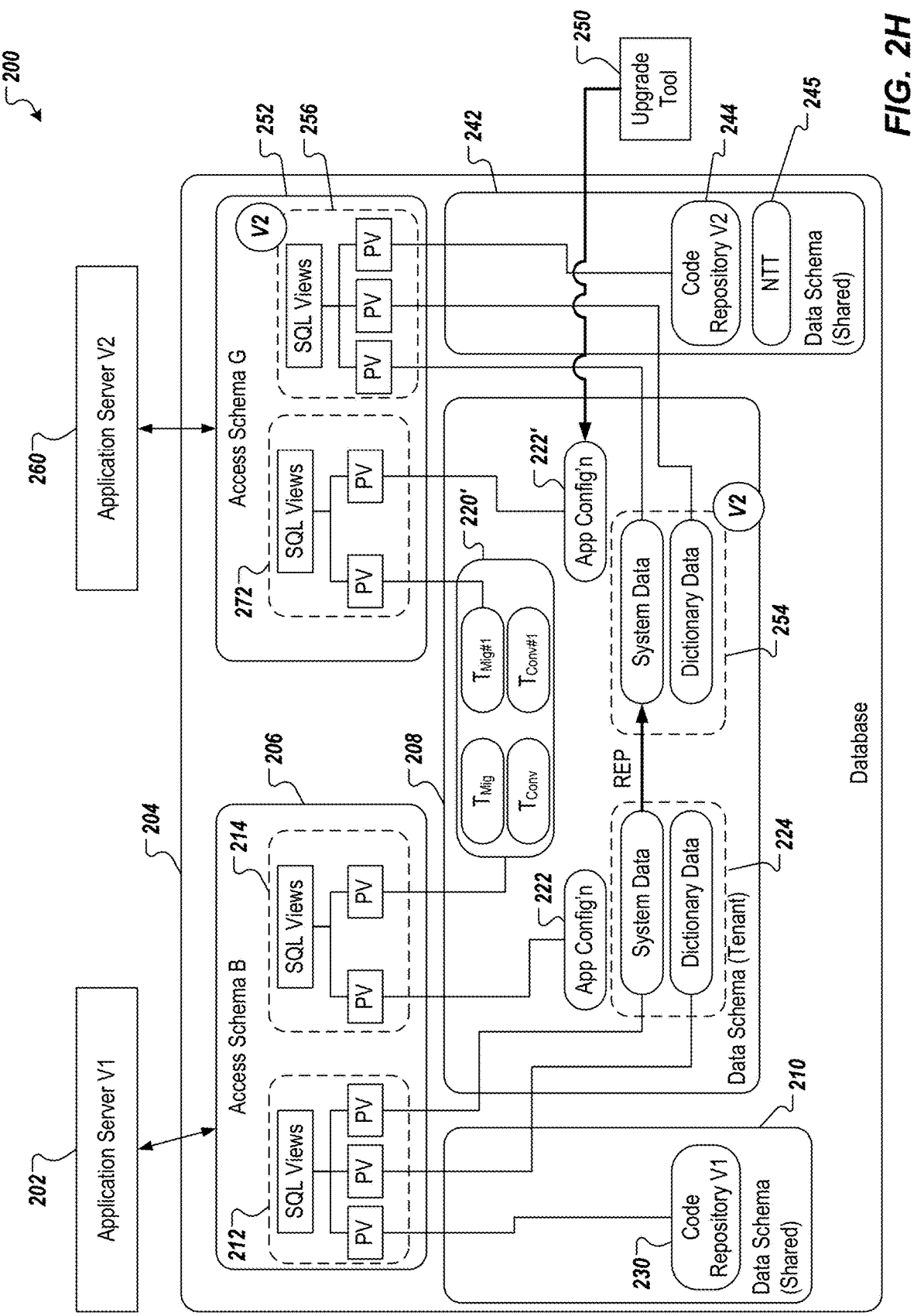

With reference to FIG. 2H, the upgrade tool 250 creates the application views 272 in the access schema 252. In some examples, the data deploy tool (e.g., R3trans) deploys the target release content to cloned tables (e.g., $T_{Import \#1}$).

Figure 2I:
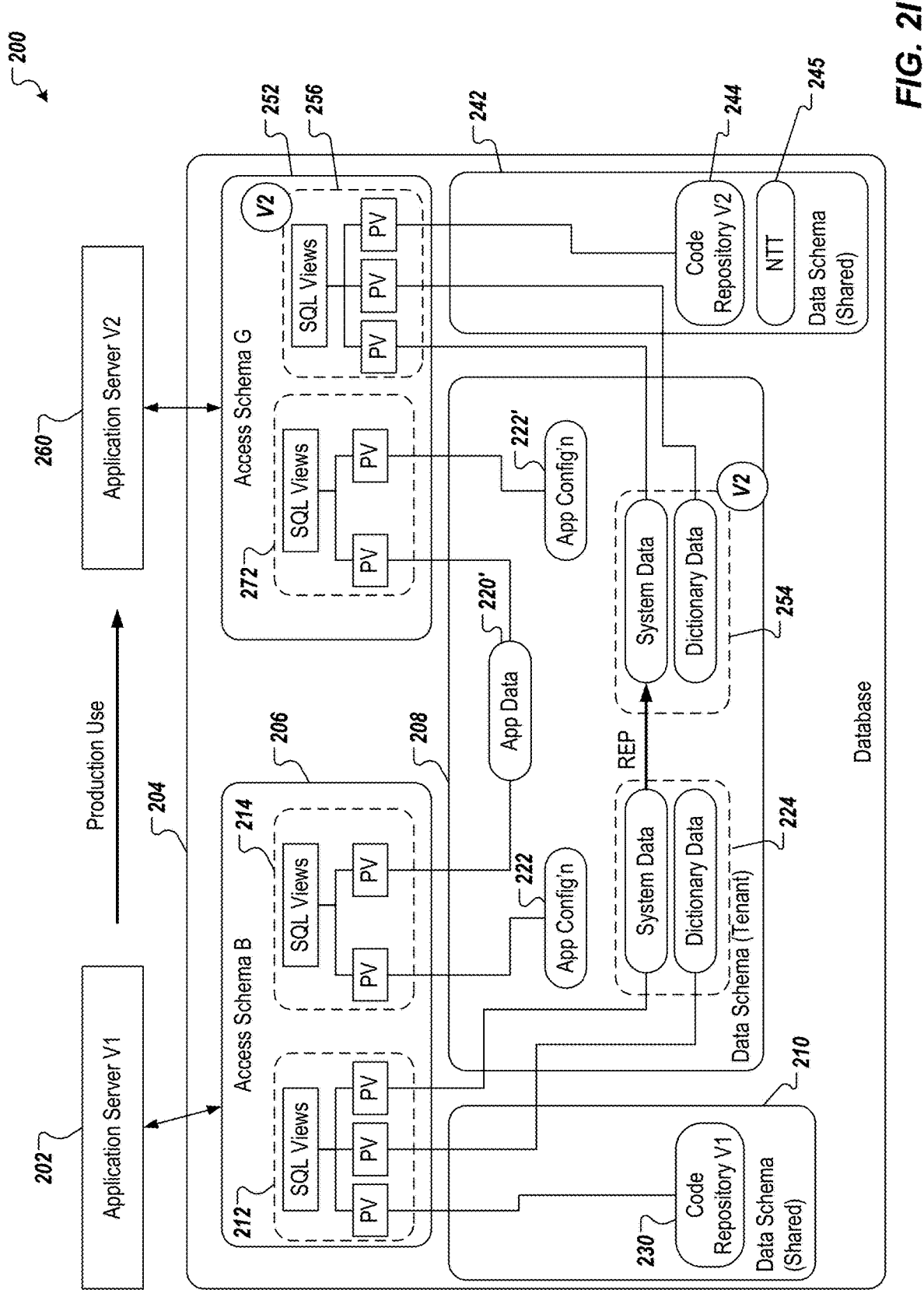
Figure 2J:
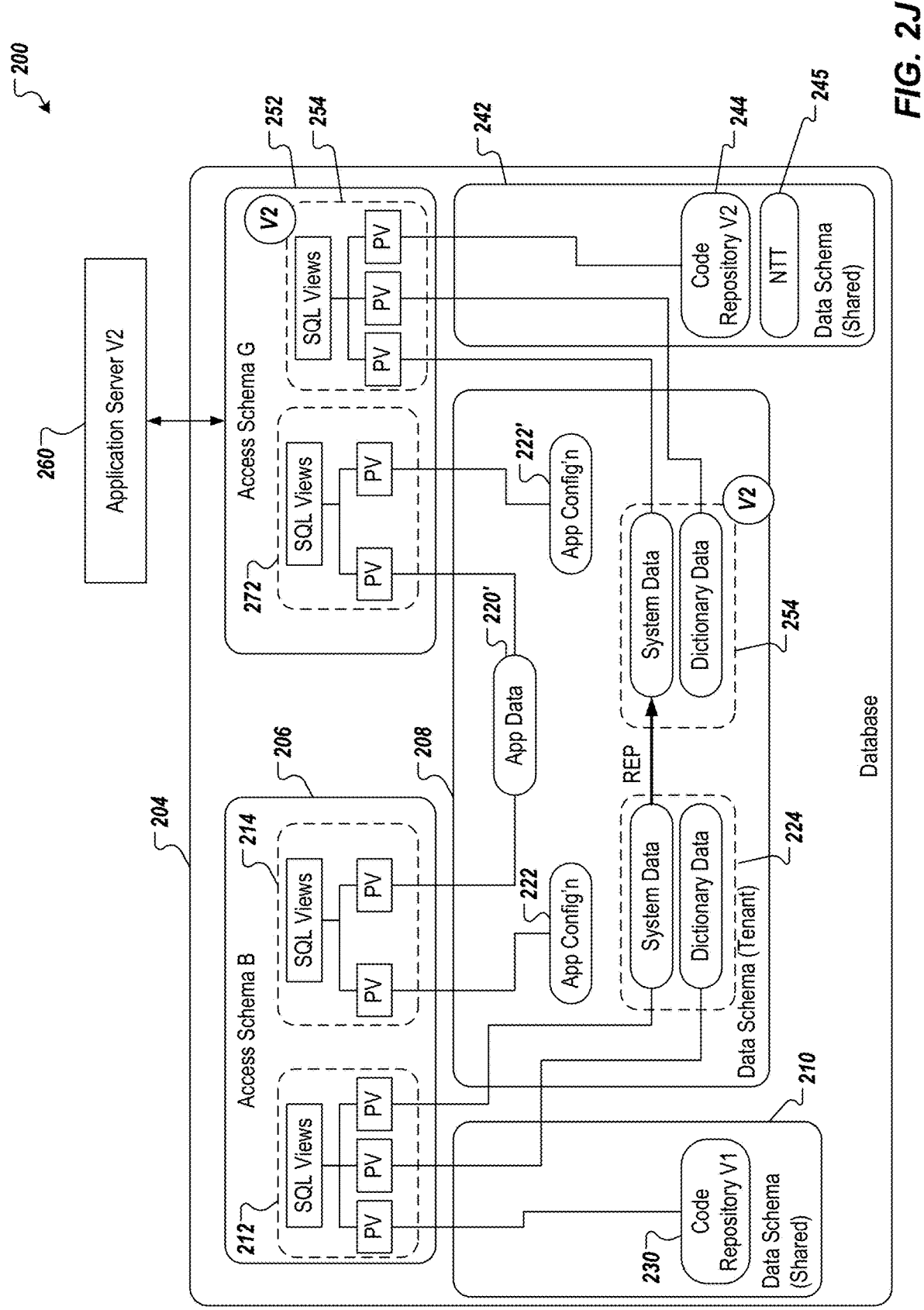
Figure 2K:
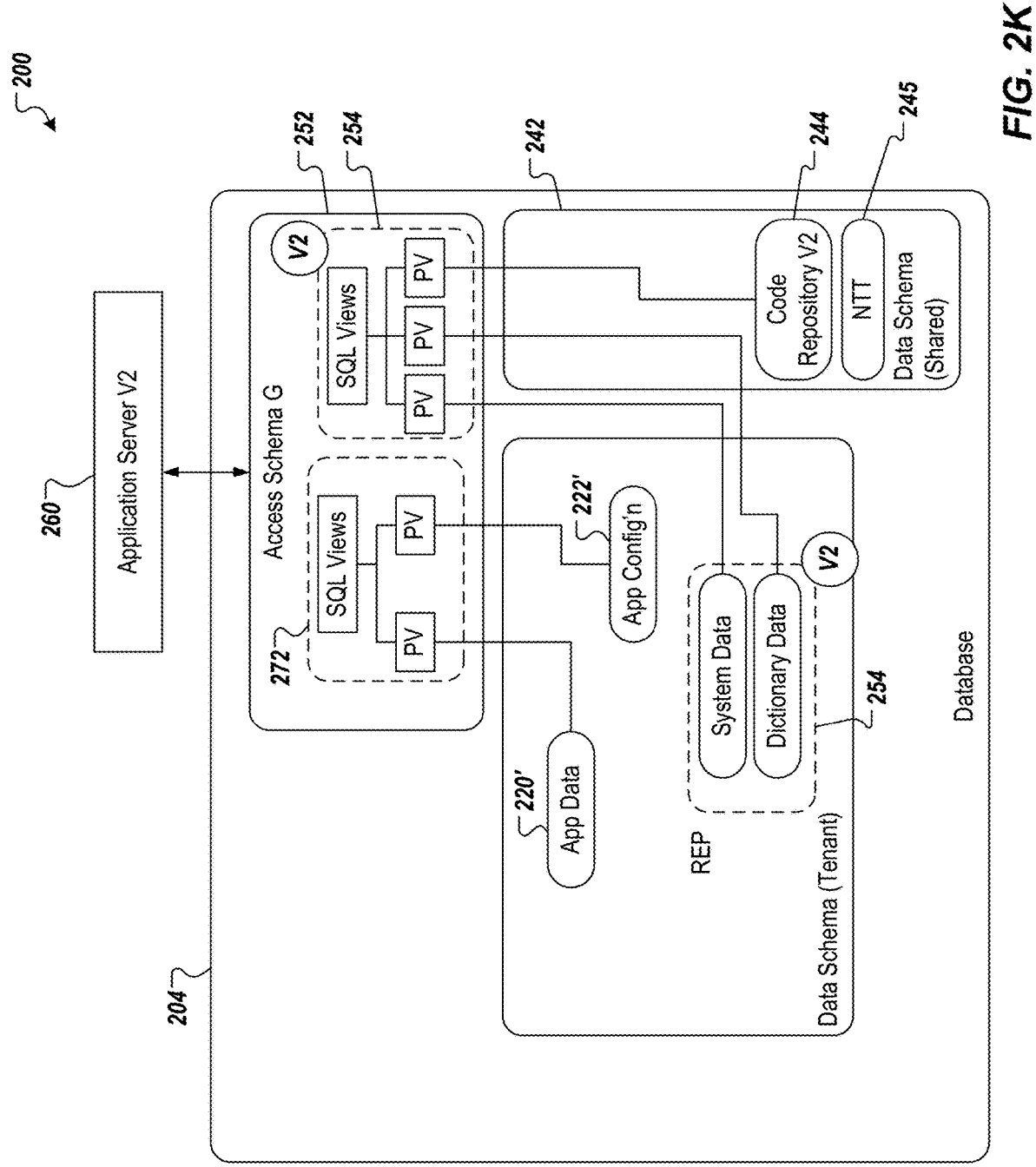

With reference to FIGS. 2I-2K, production use is switched to the application server 260. In some examples, the upgrade tool 250 calls the application server 202 to run a soft shutdown. A soft shutdown can include: preventing login to the application server 202, preventing any new transactions to be started, and upon a completed transaction ("commit" of a pending transaction) the user is logged off. The upgrade tool 250 opens the application server 260, so users can login. The upgrade tool 250 configures a dispatcher to re-direct users to the application server 250. In some examples, the blue system is deconstructed, in which the upgrade tool 250 stops the application server 202. The upgrade tool 202 drops the views 212, 214 in the access schema 206, and drops the access schema 206. The upgrade tool 250 disconnects the data schema 210, and drops tables that had been cloned (e.g., sets $T_{Act}$, $T_{Mig}$, $T_{Conv}$, $T_{Import}$). The sets $T_{Act \#1}$, $T_{Mig \#1}$, $T_{Conv \#1}$, and $T_{Import \#1}$ are now in production use.

Figure 3:
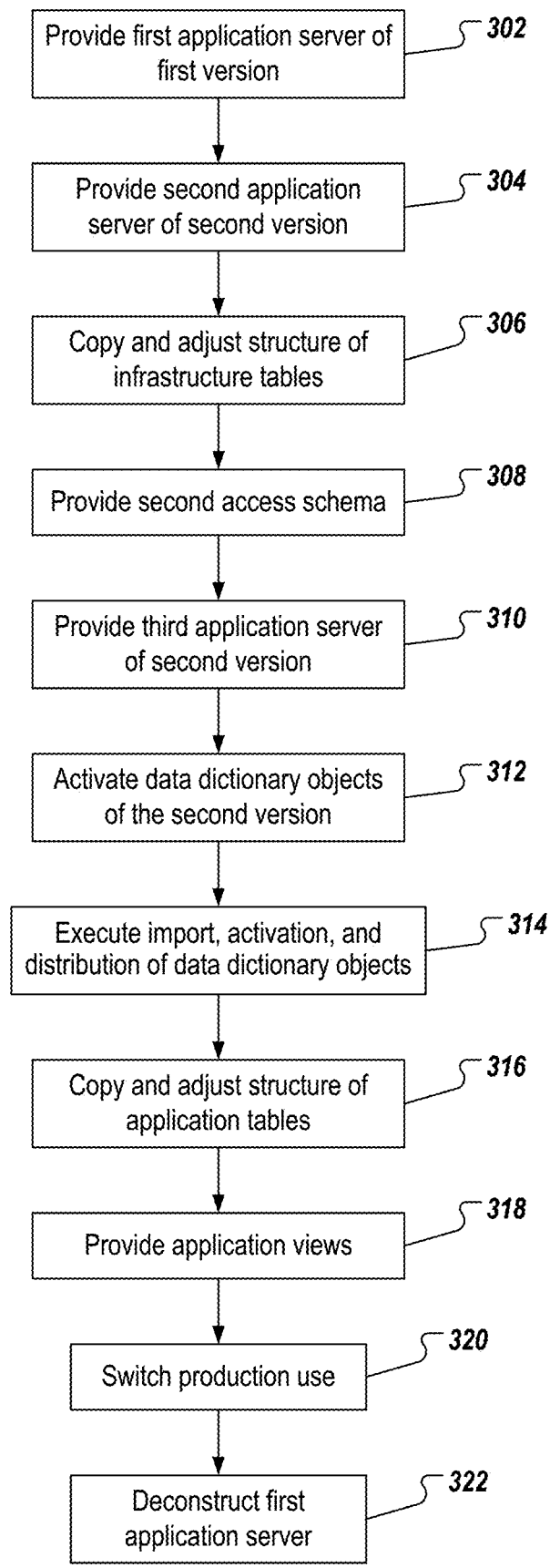
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices (e.g., the server system 108 of FIG. 1). The example process 300 is executed for upgrade of an application from a first version to a second version.

A first application server corresponding to the first version is provided (302). For example, and as described herein with reference to FIG. 2A, the system 200 includes the application server 202 and the database system 204. The application server 202 hosts one or more applications, which corresponds to the first version (V1, source release). In some examples, the example of FIG. 2A represents production runtime (e.g., blue runtime) before execution of the upgrade procedure of the present disclosure.

A second application server corresponding to the first version is provided (304). For example, and as described herein with reference to FIG. 2B, an upgrade tool initiates the upgrade from the source release (V1) to the target release (V2), and the application server 240 (e.g., green) is instantiated by the upgrade tool 250 to execute upgrade activities, as described herein. As depicted in FIG. 2B, the application server 240 is linked to the access schema 206 (blue access schema).

Infrastructure tables are copied and structures are adjusted (306). For example, and as described herein with reference to FIG. 2C, the upgrade tool 250 creates the access schema 250 (green access schema) in the database system 204. The upgrade tool 250 clones (CLN) the set $T_{Act}$, with content, as the set $T_{Act\ \#1}$. For example, the application server 240 generates DDL statements for creating copies of the tables in the set $T_{Act}$, and a DDL executor of the SOI tool executes the DDL statements to provide the set $T_{Act\ \#1}$. As also described herein, the table delta handler adjusts the structure of the tables in the set $T_{Act\ \#1}$ to the target release (V2). For example, the table delta handler reads the target table definitions from the data schema 242, compares the structure of tables in the set $T_{Act\ \#1}$ with the target definition, computes a statement to be executed to adjust the structure (e.g. "add field," "change field type"), and computes statements to create table structures corresponding to the target release (V2). The upgrade tool 250 executes the statements.

A second access schema is provided (308). For example, and as described herein with reference to FIGS. 2C and 2D, the upgrade tool 250 creates the access schema 252 (green access schema) in the database system 204, and creates system views 256 (e.g., projection views) for tables in the set $T_{Act\ \#1}$ in the access schema 252. A third application server corresponding to the second version is provided (310). For example, and as described herein with reference to FIG. 2E, the upgrade tool 250 configures an application server 260 to connect to the access schema 252 and starts the application server 260. The application server 260 executes the target release (V2) kernel software. In some examples, the second application server (e.g., the application server 240) is stopped.

Data dictionary objects of the second version are activated (312), import activation and distribution of data dictionary objects are executed (314), and application tables are copied and structures are adjusted (316). For example, and as described herein, a data deploy tool (e.g., R3trans) deploys the target release table definitions to the set $T_{Act\ \#1}$. This includes all changed table definitions in the target release for both the set $T_{Act}$ and the set $T\backslash T_{Act}$. In some examples, the data dictionary activator (i.e., data dictionary activator of the target release (V2)) computes the target structure definitions. In some examples, the upgrade tool 250 determines which tables will receive an import of data during the upgrade (e.g., a set of tables written by data import tool denoted as $T_{Import}$) and which tables are written by an application data migration program (e.g., a set of tables denoted as $T_{Mig}$). In some examples, a data dictionary distribution program executed in the application server 260 computes the DDL statements to adjust tables to the target definition. In some examples, for tables in the set $T_{Import}$ and the set $T_{Mig}$, a statement is computed to create a new table with a new name, $T_{Import\ \#1}$ and $T_{Mig\ \#1}$, respectively. Tables with a complex structure change are cloned and the data is adjusted (e.g., a set of tables with a complex structure change, written by the conversion program, and denoted as set $T_{Conv}$). The data dictionary distribution program computes the DDL statements to create the views in the access schema 252 with the target definition. The upgrade tool 250 adjusts the tables in the data schema 208 using the statements computed before. The upgrade tool 250 clones the tables in the data schema 208 using the statements computed before. In some examples, the application data 220 is cloned to provide application data 220', and the application configuration data 222 is cloned to provide application configuration data 222'. In further detail, the upgrade tool 250 sets tables in $T_{Import}$, $T_{Mig}$, and $T_{Conv}$ in the blue system to read-only, and tables in $T_{Import}$, $T_{Mig}$, and $T_{Conv}$ are cloned to provide $T_{Import\ \#1}$, $T_{Mig\ \#1}$, and $T_{Conv\ \#1}$, respectively, and the structures are adjusted to the target release. Application views are provided (318). For example, and as described herein with reference to FIG. 2H, the upgrade tool 250 creates the application views 272 in the access schema 252. In some examples, the data deploy tool (e.g., R3trans) deploys the target release content to cloned tables (e.g., $T_{Import\ \#1}$).

Production use is switched (320), and the first application server is deconstructed (322). For example, and as described herein, production use is switched to the application server 260. In some examples, the upgrade tool 250 calls the application server 202 to run a soft shutdown, and opens the application server 260, so users can login. The upgrade tool 250 configures a dispatcher to re-direct users to the application server 250. In some examples, the blue system is deconstructed, in which the upgrade tool 250 stops the application server 202. The upgrade tool 202 drops the views 212, 214 in the access schema 206, and drops the access schema 206. The upgrade tool 250 disconnects the data schema 210, and drops tables that had been cloned (e.g., sets $T_{Act}$, $T_{Mig}$, $T_{Conv}$, $T_{Import}$). The sets $T_{Act\ \#1}$, $T_{Mig\ \#1}$, $T_{Conv\ \#1}$, and $T_{Import\ \#1}$ are now in production use.

Implementations of the present disclosure achieve one or more of the following example advantages. As compared to a traditional upgrade procedure, downtime is obviated, and no temporary tables are created (thus, the upgrade procedure of the present disclosure is faster and requires less processing power and storage). Further, the upgrade procedure of the present disclosure avoids exchange of repository tables holding customer created data dictionary and code. Instead, the upgrade procedure of the present disclosure creates a new table that is populated with new vendor content, and the customer content is extracted from the old repository and copied to the new repository and activated there. The exchange procedure of traditional approaches is considered problematic for custom development as it has to handle unknown content of unknown quality. As compared to traditional approaches using delta procedures, the upgrade procedure of the present disclosure enables deployment of bundles of new features and content that uses the new features.

Figure 4:
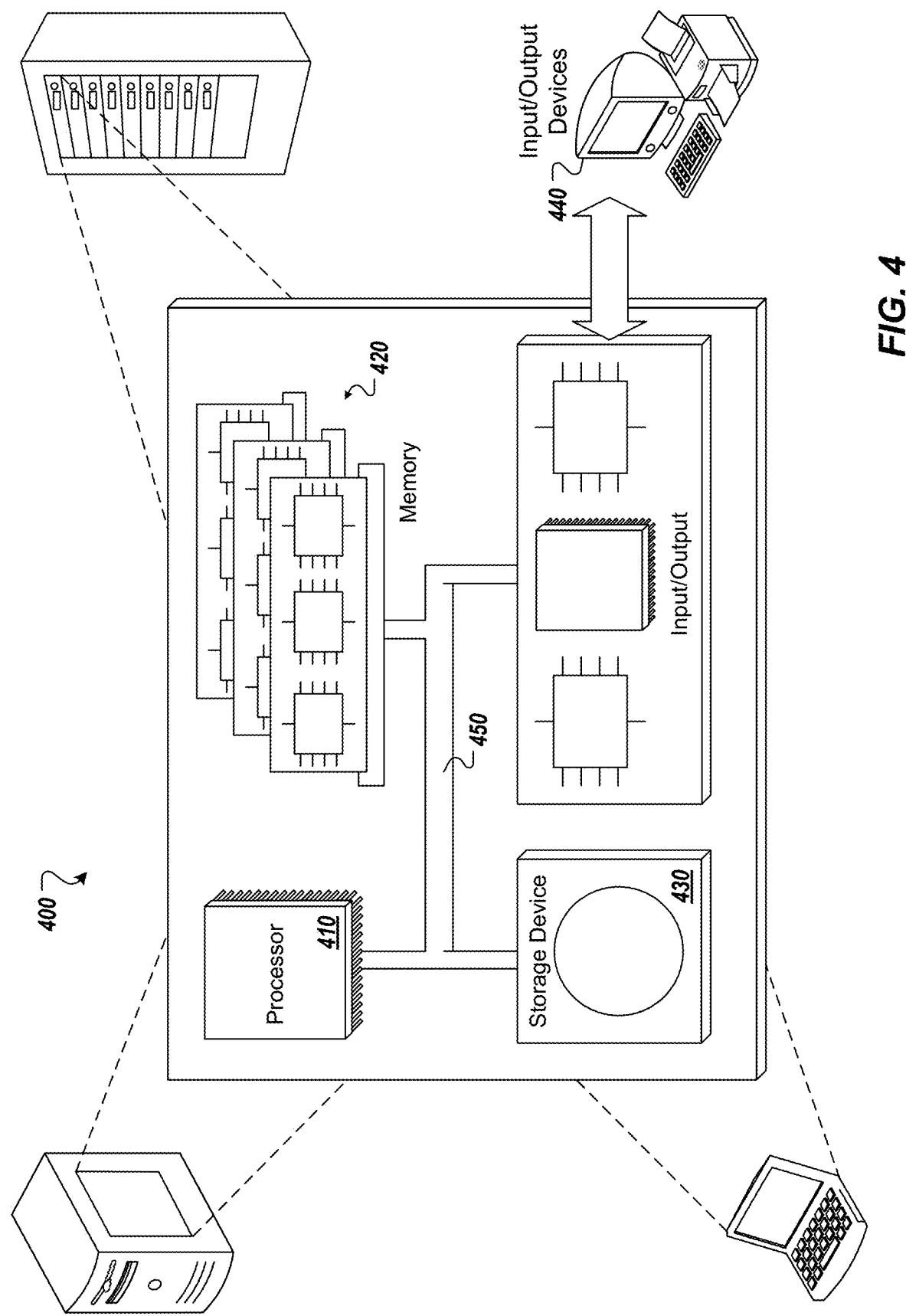
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for upgrade of an application that interacts with data stored in a database system from a first version to a second version, the method being executed by one or more processors and comprising:
    providing a first application server corresponding to the first version, the first application server enabling production use of the database system during an upgrade procedure, the first application server interacting with at least a first set of infrastructure tables of the first version within the database system through a first access schema;
    providing, by an upgrade tool and during the upgrade procedure, a second application server corresponding to the first version, the second application configured to execute at least a portion of the upgrade procedure by interacting with data schema of the database system through the first access schema;
    adjusting a structure of at least one infrastructure table in a second set of infrastructure tables to provide an adjusted structure, the structure corresponding to the first version and the adjusted structure corresponding to the second version, the second set of infrastructure tables comprising a copy of the first set of infrastructure tables;
    providing, in the database system, a second access schema comprising system views corresponding to the second version;

providing, by the upgrade tool, a third application server corresponding to the second version and being configured to interact with data schema of the database system through the second access schema; and activating, by the third application server using a data dictionary activator corresponding to the second version, data dictionary objects of the second version, the data dictionary activator comprising one or more features that are different than a data dictionary activator of the first version.

2. The method of claim 1, wherein the data dictionary objects of the second version are different than data dictionary objects of the first version.

3. The method of claim 1, wherein adjusting a structure of at least one infrastructure table in the second set of infrastructure tables comprises:
determining a difference between first table information corresponding to the first set of infrastructure tables and second table information corresponding to the second set of infrastructure tables for the second version; and
executing one or more data definition language (DDL) statements provided based on the difference to adjust the structure to provide the adjusted structure.

4. The method of claim 3, wherein determining a difference between first table information corresponding to the first set of infrastructure tables and second table information corresponding to the second set of infrastructure tables for the second version comprises reading table definitions of the second version from the second data schema, comparing the structure of tables in the second set of infrastructure tables with the table definitions, and computing the one or more DDL statements.

5. The method of claim 1, further comprising copying, using data definition language (DDL) statements provided by the second application server, the first set of infrastructure tables to provide the second set of infrastructure tables.

6. The method of claim 1, wherein adjusting is executed using data corresponding to the second version stored in a shared container deployed to the database system.

7. The method of claim 1, further comprising switching production use from the first application server to the third application server.

8. A non-transitory computer-readable storage medium coupled to one or more processors and having instructions stored thereon which, when executed by the one or more processors, cause the one or more processors to perform operations for upgrade of an application that interacts with data stored in a database system from a first version to a second version, the operations comprising:
providing a first application server corresponding to the first version, the first application server enabling production use of the database system during an upgrade procedure, the first application server interacting with at least a first set of infrastructure tables of the first version within the database system through a first access schema;
providing, by an upgrade tool and during the upgrade procedure, a second application server corresponding to the first version, the second application configured to execute at least a portion of the upgrade procedure by interacting with data schema of the database system through the first access schema;
adjusting a structure of at least one infrastructure table in a second set of infrastructure tables to provide an adjusted structure, the structure corresponding to the first version and the adjusted structure corresponding to the second version, the second set of infrastructure tables comprising a copy of the first set of infrastructure tables;
providing, in the database system, a second access schema comprising system views corresponding to the second version;
providing, by the upgrade tool, a third application server corresponding to the second version and being configured to interact with data schema of the database system through the second access schema; and
activating, by the third application server using a data dictionary activator corresponding to the second version, data dictionary objects of the second version, the data dictionary activator comprising one or more features that are different than a data dictionary activator of the first version.

9. The computer-readable storage medium of claim 8, wherein the data dictionary objects of the second version are different than data dictionary objects of the first version.

10. The computer-readable storage medium of claim 8, wherein adjusting a structure of at least one infrastructure table in the second set of infrastructure tables comprises:
determining a difference between first table information corresponding to the first set of infrastructure tables and second table information corresponding to the second set of infrastructure tables for the second version; and
executing one or more data definition language (DDL) statements provided based on the difference to adjust the structure to provide the adjusted structure.

11. The computer-readable storage medium of claim 10, wherein determining a difference between first table information corresponding to the first set of infrastructure tables and second table information corresponding to the second set of infrastructure tables for the second version comprises reading table definitions of the second version from the second data schema, comparing the structure of tables in the second set of infrastructure tables with the table definitions, and computing the one or more DDL statements.

12. The computer-readable storage medium of claim 8, wherein operations further comprise copying, using data definition language (DDL) statements provided by the second application server, the first set of infrastructure tables to provide the second set of infrastructure tables.

13. The computer-readable storage medium of claim 8, wherein adjusting is executed using data corresponding to the second version stored in a shared container deployed to the database system.

14. The computer-readable storage medium of claim 8, wherein operations further comprise switching production use from the first application server to the third application server.

15. A system, comprising:
a computing device; and
a computer-readable storage device coupled to the computing device and having instructions stored thereon which, when executed by the computing device, cause the computing device to perform operations for upgrade of an application that interacts with data stored in a database system from a first version to a second version, the operations comprising:
providing a first application server corresponding to the first version, the first application server enabling production use of the database system during an upgrade procedure, the first application server interacting with at least a first set of infrastructure tables of the first version within the database system through a first access schema;

providing, by an upgrade tool and during the upgrade procedure, a second application server corresponding to the first version, the second application configured to execute at least a portion of the upgrade procedure by interacting with data schema of the database system through the first access schema;

adjusting a structure of at least one infrastructure table in a second set of infrastructure tables to provide an adjusted structure, the structure corresponding to the first version and the adjusted structure corresponding to the second version, the second set of infrastructure tables comprising a copy of the first set of infrastructure tables;

providing, in the database system, a second access schema comprising system views corresponding to the second version;

providing, by the upgrade tool, a third application server corresponding to the second version and being configured to interact with data schema of the database system through the second access schema; and activating, by the third application server using a data dictionary activator corresponding to the second version, data dictionary objects of the second version, the data dictionary activator comprising one or more features that are different than a data dictionary activator of the first version.

16. The system of claim 15, wherein the data dictionary objects of the second version are different than data dictionary objects of the first version.

17. The system of claim 15, wherein adjusting a structure of at least one infrastructure table in the second set of infrastructure tables comprises:

determining a difference between first table information corresponding to the first set of infrastructure tables and second table information corresponding to the second set of infrastructure tables for the second version; and executing one or more data definition language (DDL) statements provided based on the difference to adjust the structure to provide the adjusted structure.

18. The system of claim 17, wherein determining a difference between first table information corresponding to the first set of infrastructure tables and second table information corresponding to the second set of infrastructure tables for the second version comprises reading table definitions of the second version from the second data schema, comparing the structure of tables in the second set of infrastructure tables with the table definitions, and computing the one or more DDL statements.

19. The system of claim 15, wherein operations further comprise copying, using data definition language (DDL) statements provided by the second application server, the first set of infrastructure tables to provide the second set of infrastructure tables.

20. The system of claim 15, wherein adjusting is executed using data corresponding to the second version stored in a shared container deployed to the database system.

* * * * *